Aug. 2, 1932.　　H. R. GIBBONS　　1,869,890
ANTIFRICTION BEARING
Filed July 29, 1926
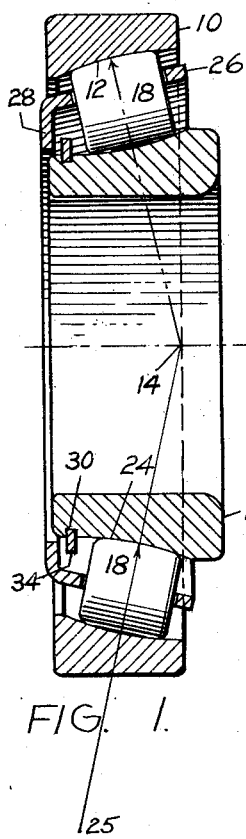
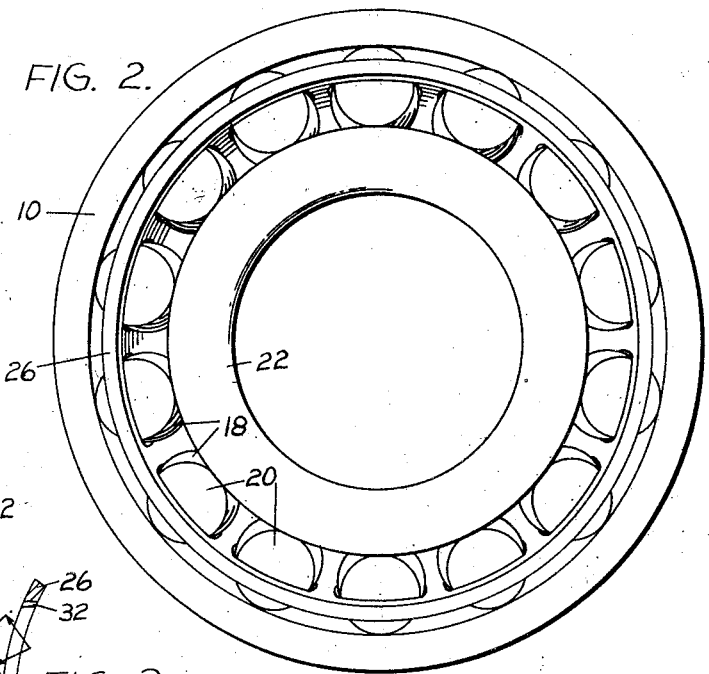
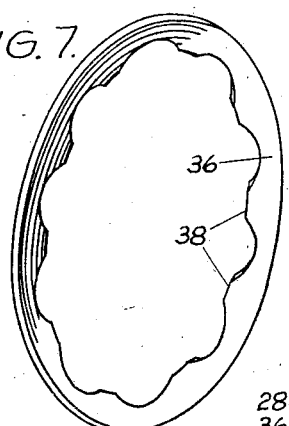
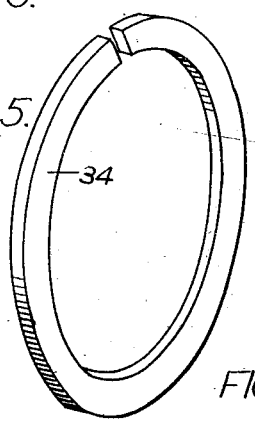
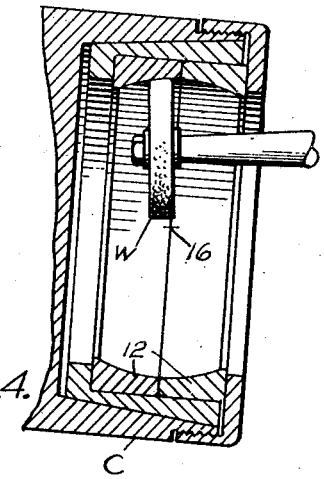
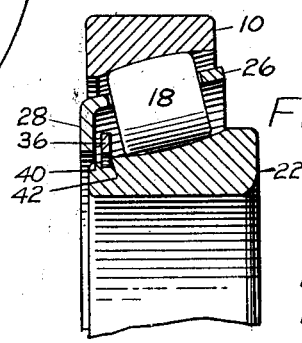
INVENTOR:
HAROLD R. GIBBONS,
BY
HIS ATTORNEY.

Patented Aug. 2, 1932

1,869,890

UNITED STATES PATENT OFFICE

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE

ANTIFRICTION BEARING

Application filed July 29, 1926. Serial No. 125,690.

This invention relates to anti-friction bearings and is herein shown, by way of example, as embodied in a single row, angular contact roller bearing of the self aligning type.

Objects of the invention are to improve generally upon bearings of this character, and to provide a simple bearing that is easy to manufacture, assemble and adjust, and that is capable of efficiently taking radial and thrust load even under conditions of misalignment.

In the drawing,

Figure 1 is a central transverse section.

Figure 2 is a side elevation.

Figure 3 is a transverse section of a portion of the separator ring.

Figure 4 is a sectional view indicating one method of grinding the races of a plurality of bearings.

Figure 5 is a perspective view of a detail.

Figure 6 is a central section of a modification.

Figure 7 is a perspective view of a detail of Figure 6.

The numeral 10 indicates an outer race ring having a spherical raceway 12, the center of curvature being at a point located in the axis of the bearing, and preferably also in the plane of the end face of the outer race ring. This provides an angular contact surface, and also enables two race rings to be ground simultaneously, as indicated in Figure 4 wherein two outer race rings 12, for example, are held by a chuck C in abutting relation and ocillated about a common center at 16 while subjected to the action of a grinding wheel W. A circular series of symmetrical convex rollers 18, having maximum diameter midway of their length run on the outer raceway 12 and conform to the raceway with substantially line contact.

An inner race ring 22 has a concave raceway 24 whose center of transverse curvature at any given cross section lies outside of the bearing as at a point 25. The raceway 24, like the raceway 12, may be considered as generated by a tilted arc revolved about the axis of the bearing. The outer raceway 12, inner raceway 24, and rollers 18 all have substantially the same radius of transverse curvature, and their centers of transverse curvature all lie on a straight line, such as line 14-25, projected from the point 14 through the maximum diameter of a roller 18. The rollers have substantially line contact with the raceways; but, particularly on the outer raceway, it is important to make sure that any departure from full line contact should not localize the load near the ends of the rollers. In other words, the radius of curvature of the rollers should be equal to or a little less than that of the raceways. The center of transverse curvature of the inner raceway 24 can be located in the plane of the end face of the inner race ring so that two such rings can be ground at one setting in a manner similar to the grinding of two outer race rings. The inner raceway 24 is extended beyond the ends of the rollers in their load sustaining positions.

The rollers 18 are uniformly spaced, held in proper alignment with respect to one another, and retained on the inner race ring by means of a ring 26 of generally frustoconical shape which encircles the rollers between their axes and the outer raceway. The separator ring has openings 32 smaller than the roller diameter, and the rollers fit the openings with a slight clearance which is insufficient to allow them to slide endwise over the larger end of the inner race ring even in the absence of a limiting device. To aid in assembly, the rollers are held from undue endwise movement by a radial flange 28 on the separator ring, the flange being carried down close to the inner race ring just outside of a groove 30 into which a split limit ring 34 is snapped. The ring 34 holds the rollers, separator and inner race ring assembled for handling as a unit. The ring 34 has an external diameter greater than the opening through the flange 28 and normally has a clearance therewith. The clearance is less than the distance the inner raceway is extended beyond the ends of the rollers at the larger end of the inner race ring. In assembling, the rollers are placed in the openings of the separator ring while the split ring is supported by the flange, and then the inner race ring is pressed down inside the rollers while the split ring is forced into the groove by the flange. The outer race ring is then pushed axially over the rollers. During this action, the rollers may tend to slide endwise towards the larger end of the inner raceway, but this movement is limited by the contact of the flange with the split ring and assembly is effected without any rotary movement of the outer race ring. In use however, the rollers are free for limited axial movement to find their proper paths of travel. All the material of the inner race ring lies inside of the surface of revolution formed by the raceway 24. Thus there are no race projections to interfere with grinding of the inner raceway, as by an oscillating grinding machine. When there are no thrust shoulders for the ends of the rollers to rub against, there is less friction and the ring can be made from thinner stock. Tapered rollers and races require some such thrust shoulders but the above described relations of race and roller curvatures makes the rollers find their own running positions with their end faces free.

In Figure 6, the ring 36 is continuous; it is originally dished into frusto-conical shape as shown in Figure 7, and provided with a series of fingers 38, which will just clear a land 40 on the race ring 22 outside of its groove. When the flange 28 encounters the ring, the fingers 38 engage a shoulder 42, and the ring is pressed out flat and contracts so it stays in the groove.

The raceway 12 may also be defined as the zone of a sphere terminating in a great circle which lies in the end face of the outer race ring. This end face can terminate short of the corresponding end of the inner race ring because the rollers naturally take a definite angle of contact which they continually seek when the bearing is running under load. When the rollers are stationary, an axial application of the outer race ring will tend to slide them up the inner race ring but this sliding is so limited by the separator that further application of axial pressure will actually snap the rollers back to their natural angular contact positions. The separator flange is also moved back away from the abutment on the inner race ring ready to run in spaced relation thereto.

I claim:

1. In a single-row, self-aligning roller bearing for thrust and radial load, an outer race ring having an angular contact raceway curved on an arc having its center at the axis of the bearing, a circular series of convexed rollers having substantially the same transverse radius of curvature as the outer raceway and contacting with the outer raceway with substantially line contact, an inner race ring having an angular contact raceway curved to conform to the rollers with substantially line contact, said inner race ring having a groove near its smaller end and having its raceway extended at its larger end beyond the corresponding ends of the rollers in their running positions, a separator ring having openings for the rollers and encircling the rollers between their axes and the outer race ring, said separator having an end flange extending adjacent to the inner race ring outside of the groove, and a limit ring in the groove of the inner race ring and having its outer diameter larger than the inner diameter of the flange, the flange having a smaller running clearance with the limit ring than the distance the larger end of the inner raceway is extended beyond the rollers, the limit ring being adapted to be engaged by said flange to apply the ring to the groove and to limit endwise movement of the rollers towards the larger end of the inner raceway in assembling, thereby enabling the outer race ring and the rollers to be assembled by relative axial movement alone; substantially as described.

2. In a single-row, self-aligning roller bearing for thrust and radial load, an outer race ring having an angular contact raceway, curved on an arc having its center at the axis of the bearing and in the plane of one end of the outer race ring, a circular series of convexed rollers having their maximum diameters midway of their length and having substantially the same transverse radius of curvature as the outer raceway and contacting with the outer raceway with substantially line contact, an inner race ring having an angular contact raceway curved to conform to the rollers with substantially line contact, a separator ring for spacing the rollers, and means for holding the rollers on one of the raceways; substantially as described.

3. In a single-row self aligning roller bearing for radial and thrust load, an outer race ring having a spherical inner raceway, the center of said spherical surface lying in the axis of the bearing and in the plane of one end of the outer race ring, an inner race ring having an angular contact raceway generated by revolving an arc about the axis of the bearing, all the material of the inner race ring being contained within the surface of revolution generated by said arc to eliminate projecting thrust shoulders, and a circular series of convex rollers having maximum diameter midway of their length and running between said raceways with their end faces free; substantially as described.

4. In a single row, self-aligning roller bearing for thrust and radial load, an outer race ring having an angular contact raceway curved spherically about a center at the axis of the bearing and at one side of the transverse center, a circular series of convex rollers having maximum diameter midway of their length and having substantially the same transverse radius of curvature as the outer raceway and contacting with the outer raceway with substantially line contact, an inner race ring having an angular contact raceway transversely curved to conform to the rollers with substantially line contact, said inner raceway being longer than the rollers, an abutment on the smaller end of the inner race ring at a point beyond the ends of the rollers when the rollers are running under load, the aforesaid arrangement of race and roller curvatures causing the rollers to automatically take an angular contact load sustaining position wherein the ends of the rollers are spaced away from the abutment, a separator ring having openings for the rollers and holding the rollers on the inner race ring, said separator ring having a flange bent inwardly and arranged outside of the abutment, the flange having a lateral clearance with the abutment in the running position of the rollers to allow the rollers to find their path of travel and arranged to contact with the abutment to limit endwise climbing movement of the rollers along the inner raceway when the outer race ring is pushed endwise over the rollers in assembling and mounting the bearing; substantially as described.

5. In a single-row, self-aligning roller bearing for thrust and radial load, an outer race ring having an angular contact raceway curved spherically about a center at the axis of the bearing and at one side of the transverse center, a circular series of convex rollers contacting with the outer raceway, an inner race ring having an angular contact transversely curved raceway longer than the rollers, an abutment on one end of the inner raceway at a point beyond the ends of the rollers when the rollers are in their running load sustaining position, the arrangement of race and roller curvatures causing the rollers to automatically take an angular contact load sustaining position wherein the ends of the rollers are spaced away from the abutment, a separator for holding the rollers, the separator having a flange bent inwardly alongside the abutment and having a lateral clearance with the abutment in the running position of the rollers to allow the rollers to find their path of travel, the extended inner raceway for the rollers allowing the flange to contact with the abutment to limit endwise climbing movement of the rollers along the inner raceway when the outer race ring is pushed endwise over the rollers in assembling and mounting the bearing; substantially as described.

6. In a single-row, self-aligning roller bearing for thrust and radial load, an outer race ring having an angular contact raceway curved spherically about a center at the axis of the bearing end at one side of the transverse center, a circular series of convex rollers contacting with the outer raceway, an inner race ring having an angular contact transversely curved raceway longer than the rollers, the arrangement of race and roller curvatures causing the rollers to automatically take an angular contact load sustaining position wherein the ends of the rollers are spaced from the ends of the inner raceway, a separator for the rollers, and devices on the separator and the inner race ring for limiting the endwise climbing movement of the rollers along the inner raceway when the outer race ring is pushed endwise over the rollers in assembling and mounting the bearing, said devices being spaced apart laterally when the rollers are running under load; substantially as described.

7. In a single-row self-aligning roller bearing for taking thrust and radial load, an inner race ring, an outer race ring, rollers between the rings, the race surfaces of the two rings having the same radius of curvature transversely and projecting beyond the ends of the rollers, one race surface defining the zone of a sphere and the rollers having substantially the same transverse curvature as both races whereby the rollers naturally take a load-sustaining or running position making a definite angle of contact with the axis of the bearing, a roller separator having a stop flange, an abutment on the inner race ring, the stop flange and the abutment providing means to limit sliding of the rollers up the inner race surface during assembly, whereby the axial application of the outer race ring to the rollers will snap the rollers back into their natural running or self-seeking angular contact positions and move the stop flange out of engagement with the abutment for running in spaced relation thereto; substantially as described.

8. In a single-row self-aligning bearing for taking thrust and radial load, an inner race ring, an outer race ring narrower than the inner race ring, convex rollers between the rings, the race surfaces of the two rings having the same radius of curvature transversely and projecting beyond the ends of the rollers, the outer race surface defining the zone of a sphere terminating in a great circle located in the end face of such race ring and the rollers having substantially the same transverse curvature as both races, a roller separator having a stop, an abutment carried near the smaller end of the inner race ring to hold the rollers against escape therefrom, the stop and the abutment providing means to limit sliding of the rollers up the inner race surfaces during the axial application of the outer race ring, the abutment being spaced from the stop and from the rollers when the bearing is running under load; substantially as described.

In testimony whereof I hereunto affix my signature.

HAROLD R. GIBBONS.

CERTIFICATE OF CORRECTION.

Patent No. 1,869,890. August 2, 1932.

HAROLD R. GIBBONS.

It is hereby certified that error appears in the printed specification of the above numbered patent requiring correction as follows: Page 2, after line 118, insert the following as claims 4 and 5:-

4. In a self aligning roller bearing for radial and thrust load, an outer race ring having a spherical inner raceway, the center of said spherical surface lying in the axis of the bearing and in the plane of one end of the outer race ring.

5. In a roller bearing for radial and thrust load, a race ring having an angular contact raceway generated by revolving an arc about the axis of the bearing, the center of said arc lying in the plane of one end of the race ring.

Page 2, line 119, page 3, lines 25, 55, 78 and 103, respectively, for the claim numerals 4, 5, 6, 7 and 8, read 6, 7, 8, 9 and 10; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.